Jan. 2, 1940.     T. DE PORT     2,185,801
OLEO DEVICE FOR LANDING GEARS AND THE LIKE
Filed April 27, 1931
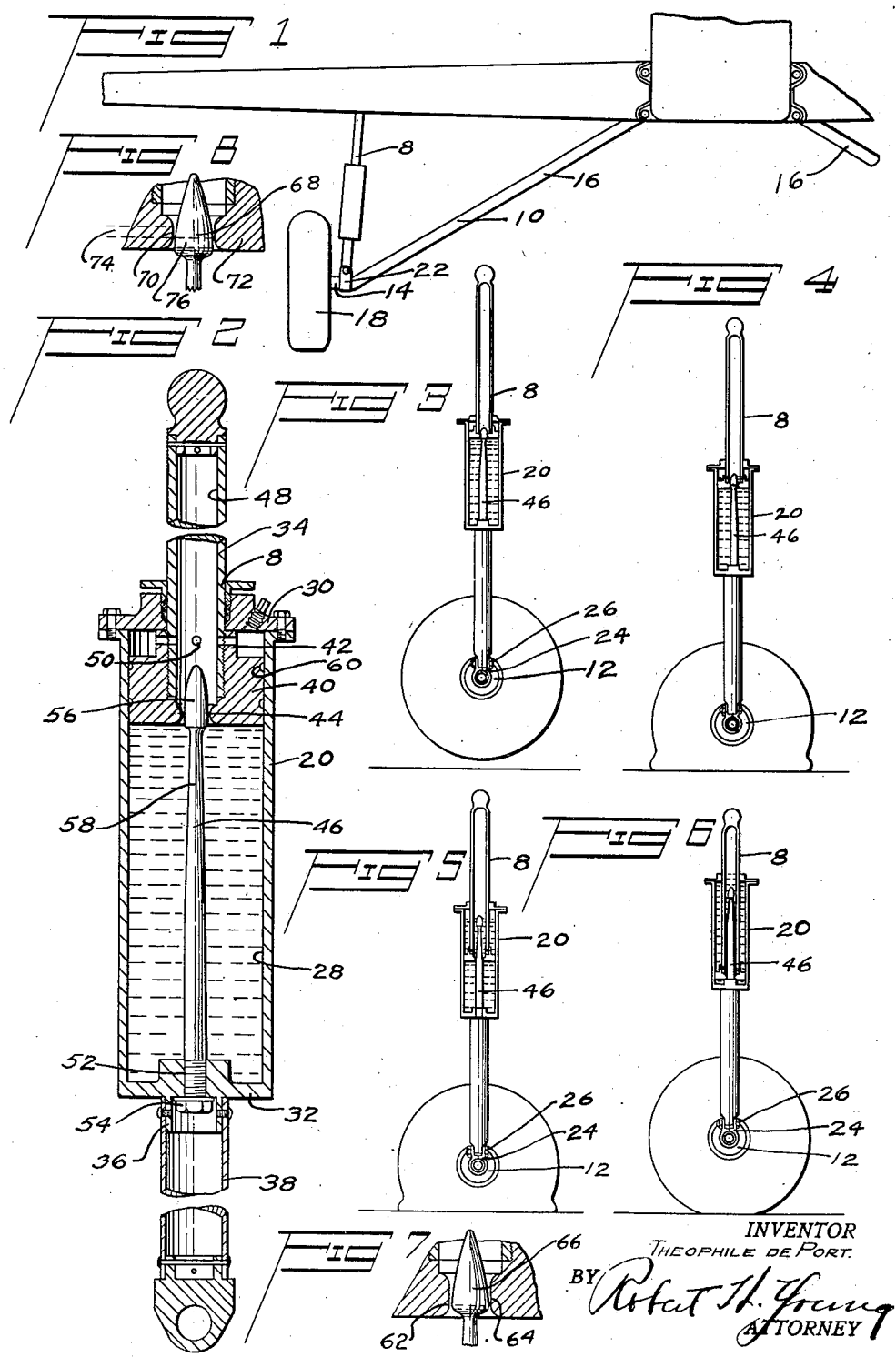
INVENTOR
THEOPHILE DE PORT.
BY
ATTORNEY Patented Jan. 2, 1940

2,185,801

UNITED STATES PATENT OFFICE 2,185,801

OLEO DEVICE FOR LANDING GEARS AND THE LIKE

Théophile de Port, Dayton, Ohio

Application April 27, 1931, Serial No. 533,110

21 Claims. (Cl. 267—64)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to improvements in the method of and means for absorbing and dissipating the kinetic energy of resiliently suspended bodies and particularly to landing gear for airplanes and other aircraft.

My invention contemplates the use of a shock absorber in the oleo leg or strut of the landing gear of the type in which a liquid is forced, from one place to another by the relative movement of the airplane body and the axle of the landing member, and thereby serving as the resisting medium for dissipating the kinetic energy of the airplane body and therefore cushioning the shocks.

It is well-known that, in accordance with the laws of mechanisms, there is a theoretical minimum impact load consistent with a given energy to be dissipated in a given length of movement. It is very desirable in aircraft landing gear or other shock absorbing devices that the kinetic energy be dissipated in the shortest possible movement of the device and that the impact load, consistent with that movement, be approximately that of the theoretical minimum.

Heretofore in airplane landing gear having resilient wheels or tires and shock absorbing devices of the character in which a metering orifice or a metering pin is employed, the piston would have to move a considerable distance prior to obtaining a piston velocity consistent with a pressure corresponding to a predetermined maximum load on the resilient wheel or tire under the corresponding deflection.

In an oleo shock absorber the velocity of the piston is known to increase from zero to its maximum speed and then to decrease again to zero. It is moreover known that the higher the piston speed and the smaller the orifice, the larger will be the load on the piston. The most efficient type of oleo shock absorber is one in which the load on the piston is constant throughout its entire stroke. The maximum efficiency is obtained when the maximum load on the piston is maintained throughout the entire stroke. In accordance with my invention I have provided means whereby the relative movement of the piston and cylinder is substantially restrained against movement during the initial building up of the loads on the tire until the tire has been deflected to a predetermined maximum value depending upon the given energy to be dissipated by conversion into heat energy, during which time the piston has moved relative to the cylinder a relatively short distance, but has reached its maximum velocity consistent with the maximum load. From this point of the stroke of the piston, the impact energy is gradually dissipated and the piston velocity gradually decreases to zero, while the tire is kept substantially deflected until the bulk of the energy is dissipated. In order to reach the maximum efficiency of the shock absorber it is necessary to reach the maximum load without expending any appreciable part of the available piston stroke and then to maintain this load constant throughout a major portion of the stroke. To this end the ratio of area of the piston to the area of the orifice is gradually increased so that the load is maintained constant.

It is, therefore, the primary object of my invention to provide an improved method of dissipating the energy, due to the vertical velocity during landing of an airplane having a resilient suspension medium of given characteristics and an energy dissipating medium, by causing the resilient suspension medium of the airplane, such as the tire of the landing member, to be deflected to a predetermined degree, thereby storing a part of the kinetic energy; simultaneously building up the impact load to substantially its maximum during the deflection of the suspension medium, by restricting the airplane from moving relative to the ground except for the tire deflection, or relative to the axle of the landing member; and, thereafter dissipating the energy without increasing the impact load consistent with the predetermined deflection of said tire.

It is a further object of my invention to provide an improved shock absorber of the oleo type for cooperating with the suspension medium of the airplane, in which is provided means whereby displacement of the liquid from one chamber to another in the oleo or shock absorber is, restricted except for a relatively small quantity, entirely restricted during the predetermined deflection of the suspension medium. Thus the airplane body is substantially entirely restrained from relative movement with respect to the axle of the landing member, but has moved with relation to the ground a distance equal to the deflection of the tire, thereby building up the impact loads to a predetermined degree and not in excess of the maximum allowable for the landing gear; and in which is provided means whereby after the tire has been deflected, displacement of the liquid from one chamber to another in the oleo is permitted without increasing the load beyond the maximum allowable.

The principle of the invention may be best understood by reference to the following description of several illustrative embodiments thereof shown in the accompanying drawing, wherein:

Fig. 1 is a front elevational fractional view of an airplane showing only one complete half of a landing gear embodying my invention;

Fig. 2 is a vertical sectional view of my novel oleo leg;

Figs. 3, 4, 5 and 6 are four views of the oleo leg and tire arrangements at different consecutive stages respectively in landing, the oleo leg being shown in section; and Figs. 7 and 8 are fractional views of further modifications of my invention.

Referring to the drawing, the illustrative oleo leg 8, shown in Figs. 2 to 6 embodying one form of my invention as applied to a conventional landing gear 10 of a monoplane (Fig. 1), is connected at its lower end to a wheel 12 through the axle end portion 14 of a strut member 16, the upper end of the oleo leg being secured in the conventional manner to the airplane wing, preferably by a ball and socket joint.

Pneumatic means, such as a pneumatic tire 18 mounted on the wheel 12, constitutes the resilient suspension medium for normal taxiing of the airplane and cooperates with a shock absorber or damper 20 to check or absorb the shock of the airplane when landing. The shock absorber forms a part of the oleo leg 10 that extends substantially vertically and is hingedly connected at its lower end to the axle portion 16 of the strut member by means of a strap 22, the strap 22 being provided with a split socket 24 that receives a lug 26 rigidly secured to the oleo leg at the lower end thereof.

The shock absorber, as illustrated in Figs. 2 to 6, comprises preferably a cylinder, or other appropriately shaped chamber 28, having heads 30 and 32, the former being apertured to receive a hollow cylindrical plunger rod 34, the latter being provided with an exterior downward projection 36, to which is rigidly connected an extension 38 of suitable length.

Within the cylinder 28 is a plunger 40 having an upwardly projecting hollow fitting 42 that is threaded to the open end of the plunger rod 34 by a threaded connection, the upper end of the fitting abutting against the head 30 to determine the normal or inoperative position of the plunger. The plunger 40 is provided with a central port or opening 44 that communicates with the space within the hollow plunger rod and cooperates with a metering pin 46 in a manner hereinafter described.

The cylinder 28 when in use is filled with a liquid, such as mineral or vegetable oil, to a predetermined height depending upon the relative internal volumes of the available space for the displacement of liquid in the oleo leg when the oleo leg is extended and compressed as shown in Figs. 3 and 6 respectively. This liquid which forms the resisting medium of the shock absorber, is permitted to pass upwardly from the cylinder chamber on the lower side of the plunger, through the passage 44 into the plunger cylinder 48 as the plunger moves downwardly and through a plurality of passages 50 into the cylinder chamber on the opposite side of the plunger; and is controlled in its passage by means of the metering pin that is centrally vertically disposed within the cylinder chamber, one end of which is fixedly secured within a threaded opening 52 of the head by a set nut 54, the other end of which is disposed within the passage 44. The passage is preferably formed with rounded edges or stream lined to effect a laminar flow of the liquid and thereby prevent a foaming of the liquid.

The metering pin 46 is formed at its upper end with a bullet-shaped or stream lined head 56 having the base portion thereof of predetermined uniform cross sectional area for a predetermined length and with a calculated or predetermined frustro-conically tapered body portion 58 that gradually diverges from a point substantially at the inner end of the head 56 and which may extend to the lower end or base of the pin; the head 56 being stream lined to maintain the laminar flow of the liquid. In the neutral or inoperative position of the shock absorber the bullet-shaped head of the metering pin is disposed in the passage 44, providing therewith a restricted passage for the flow of liquid into the plunger rod cylinder, the walls of which are sufficiently spaced from the stream lined end portion of the head 56 to permit relatively restricted flow of fluid for a predetermined distance in the relative movement of the plunger and pin and thereby build up an impact load substantially equal to the maximum allowable impact load in a relatively short distance. Preferably the metering pin is formed with an abrupt frustro-conical taper that converges from the inner end of the bullet-shaped head towards the point where the tapered body portion 58 begins.

Theoretically and in accordance with my invention, the desired maximum impact load is obtained when the plunger movement is resisted by the flow resistance of liquid through a restricted orifice of substantially uniform cross sectional area for a length equal to the distance between the normal position of the plunger and pin and the position of least cross sectional area of the abrupt frustro-conical portion of the pin. However, it has been found that the desired maximum impact load may be reached at a point along the metering pin short of the theoretical distance, thus by the time the plunger has moved the entire theoretical distance, the impact load will have been in excess of that desired and it might result in structural failure. Therefore, as a measure of safety, although it may mean the obtaining of a load slightly less than that desired, the metering pin is provided with the above-referred-to abrupt frustro-conical taper found by experience to give the best results.

The plunger 40 has a sliding fit with the walls of the cylinder 28 and is provided with two or more circumferential grooves 60 so as to trap liquid seepage and thereby form a seal.

The operation of this embodiment of my invention is as follows:

It will be seen from an inspection of the several stages in the operation of the landing gear illustrated in the drawing, that so long as the airplane is off the ground the piston or plunger 40 and cylinder 28 are in an extended position with the bullet-shaped end 56 of the metering pin disposed within the passage 44 of the plunger to provide a relatively restricted opening so that during the initial impact of the landing on the ground the plunger will encounter a practically solid liquid body; thus the pneumatic suspension medium, such as the air in the tire, will be compressed and the tire deflected as shown in Fig. 4 to a predetermined extent. During this period of deflection of the tire, the impact load of the airplane will have been built up to the desired maximum, a part of the kinetic energy of the airplane will have been absorbed by the pneumatic suspension and the plunger by a metering of the liquid through the restricted opening will have moved from a point along the bullet-shaped head to slightly beyond the inner end thereof, a distance corresponding to the time required to deflect the tire to a predetermined extent and to simultaneously build up the impact load to the desired maximum. Thereafter the tire remains deflected under the maximum impact load as the remainder of the kinetic energy is being dissipated by the metering of the liquid, as the plunger moves along the tapered body portion 58 of the pin, which, as heretofore described, is calculated to maintain this predetermined or maximum allowable load on the oleo leg substantially constant throughout the major part of the stroke, while the velocity of the plunger is decreasing. Toward the end of the downward stroke of the piston successive loads on the tire corresponding to successive deflections decrease as successive loads on the plunger decrease due to the continued metering of the flow of liquid as the plunger moves downward. Thus the stored energy on the pneumatic suspension medium will have been dissipated in the last part of the stroke of the plunger and the static equilibrium between the weight of the airplane and the load on the tire equal to the weight is established.

The modifications of my invention, as shown in Figs. 7 and 8, embody the same principles as above described, except that the predetermined length of relatively restricted or throttled opening formed by protruding the stream lined head of the metering pin within the port of the plunger, as shown in Fig. 2, is obtained by merely reversing the relationship of the plunger port and metering pin head. That is to say, in Fig. 7 the port 62 is provided with a cylindrical portion 64 of predetermined length to give the required effective longitudinal dimension and the longitudinal dimension of the cross section of the pin 66 which cooperates with the port to provide constant restricted areas for a predetermined length in their relative movement, is negligible.

In Fig. 8 both the head of the metering pin 68 and the port 70 of the plunger 72 may be provided with cylindrical portions having longitudinal dimensions 74 and 76 respectively for this purpose, but in this case the combined longitudinal dimensions of these portions are equal to the predetermined effective longitudinal dimension of the cylindrical portion of the pin head shown in Fig. 2 or of the port shown in Fig. 7.

It is to be understood that my invention is not limited to the forms which are shown in the drawing, but that various changes may be made without departing from the spirit thereof.

What I claim as new and desire to secure by Letters Patent is:

1. In a shock absorber, the combination with a cylinder and a plunger working therein, said plunger having a port for the passage of liquid, of a metering pin disposed within said port for controlling a liquid, said pin having a portion of predetermined cross sectional area to provide with said port a relatively restricted passageway of predetermined uniform area for a predetermined length in the initial relative movement of said plunger and said pin from normal energy dissipating position and a portion of cross-sectional area less than said first-mentioned portion to thereafter provide a passageway of greater area for a portion of the remainder of the relative movement of said plunger and pin.

2. In an hydraulic shock absorber, the combination with a cylinder and a plunger working therein, said plunger having a port for the passage of fluid, of an extension member disposed within and movable relative to said port, said member having the portion thereof that is disposed within said port in the normal position of said cylinder and plunger providing a relatively restricted opening for automatically governing the initial acceleration imparted to the plunger, the fluid being metered through said port in such a way as to cause an increase of the pressure on the piston to substantially its maximum allowable for that stroke during the first part thereof.

3. A shock absorber comprising in combination a liquid chamber, a plunger movable in said chamber and having an orifice therein for the passage of liquid therethrough and a metering pin cooperating with the orifice throughout the extent of travel of said plunger, said pin being provided with a portion disposed within said opening to form a relatively restricted passageway for the flow of said liquid during the movement of said plunger for a predetermined distance to obtain a force on said plunger substantially equal to the maximum force throughout said travel and a reduced portion gradually tapering downwardly and outwardly from the inner end of said first mentioned portion for cooperating with said opening to meter the liquid flow and thereby maintain said force substantially constant throughout a major portion of the plunger movement.

4. As an article of manufacture, a metering pin, adapted to cooperate substantially throughout its entire length with an orifice of predetermined cross sectional area in a shock absorber plunger that is movable relative to a liquid containing chamber, for controlling the flow of liquid through said orifice, said pin having an end portion of predetermined length the cross sectional area of which is predetermined and slightly less than the cross sectional area of said orifice substantially throughout its effective length to provide a relatively restricted passageway with said plunger orifice in the normal position thereof and for a predetermined distance in their relative movement and a portion of reduced cross sectional area tapering gradually from a point substantially at the inner end of said first mentioned portion downwardly and outwardly towards its base.

5. A shock absorber comprising in combination a liquid chamber, a plunger movable in said chamber and having an orifice therein for the passage of liquid therethrough and a metering pin cooperating with the orifice throughout the extent of travel of said plunger, said pin being provided with a portion disposed within said opening to form a relatively restricted passageway for the flow of said liquid to control the movement of said plunger for a predetermined distance to obtain a force on said plunger substantially equal to the maximum force throughout said travel and a reduced portion adjacent the inner end of said first-mentioned portion for cooperating with said opening to increase the liquid flow to thereby prevent a further increase of said force.

6. In a shock strut having a restricted orifice through which fluid is forced, a metering pin cooperating with such orifice having an initial portion causing an abrupt increasing resistance and a second portion maintaining such resistance at a constant value throughout the main portion of the stroke.

7. In a shock strut having a restricted orifice through which fluid is forced, a metering pin cooperating with such orifice having an initial portion causing an abrupt increasing resistance, a second portion maintaining such resistance at a constant value throughout the main portion of the stroke, and a third portion causing a decreased resistance to permit the tires of the landing gear to restore themselves to substantially their static loaded position.

8. In a shock strut having a restricted orifice through which fluid is forced, means for forcing the fluid through said orifice, a metering pin cooperating with the orifice having an initial portion causing an abruptly increasing resistance to the initial shock of landing, a second portion causing a prolonged constant resistance after the initial shock, and a third portion causing a decreasing resistance at the end of the landing shock.

9. In a shock strut having a restricted orifice through which fluid is forced, means for forcing fluid through the orifice, a metering pin cooperating therewith and having a short initial part of abruptly increasing cross section, a second part of decreasing cross section, and a third part of gradually increasing cross section.

10. In a shock strut having a restricted orifice through which fluid is forced, means for forcing fluid through the orifice, a metering pin cooperating therewith having a varying cross sectional area so correlated to the velocity of said first mentioned means that substantially constant resistance is maintained throughout substantially the entire stroke of the first mentioned means.

11. In a shock absorber designed for use in connection with a resilient medium of given load-deflection characteristics comprising a cylinder and a piston providing a liquid chamber and an air chamber with a communicating orifice therebetween and hydraulic resistance regulating means correlated with said resilient medium and responsive to relative movement between said piston and cylinder to regulate the resistance to liquid flow between said chamber so as to produce in the shock absorber and during a relatively small initial portion of the piston stroke and for the given kinetic energy to be dissipated, a maximum load not in excess of the maximum allowable and thereafter to regulate the resistance to prevent during the remaining and major portion of the stroke an increase in load beyond the maximum allowable.

12. In a shock absorber designed for use in connection with a resilient medium of given characteristics comprising a cylinder and a piston providing a liquid chamber and an air chamber with a communicating orifice therebetween and hydraulic resistance regulating means correlated with said resilient medium and responsive to relative movement between said piston and cylinder to regulate the resistance to liquid flow between said chambers so as to produce in the shock absorber and during a relatively small initial movement between said piston and said cylinder and for the given kinetic energy to be dissipated, a maximum load not in excess of the maximum allowable and thereafter to regulate the resistance to prevent during the remaining and major portion of the stroke an increase in load beyond the maximum allowable.

13. In a shock absorber designed for use in connection with a resilient medium of given characteristics comprising a cylinder and a piston providing a liquid chamber and an air chamber with a communicating orifice therebetween and hydraulic resistance regulating means correlated with said resilient medium and responsive to relative movement between said piston and cylinder to regulate the resistance to liquid flow between said chambers so as to produce in the shock absorber and during a relatively small initial movement between said piston and said cylinder and for the given kinetic energy to be dissipated, a maximum load not in excess of the maximum allowable and thereafter to regulate the resistance to prevent during the remaining and major portion of the stroke an increase in load beyond the maximum allowable, said regulating means including metering means to maintain the maximum resistance at a substantially constant value throughout the major portion of the stroke.

14. In a shock absorber designed for use in connection with a resilient medium of given characteristics comprising a cylinder and a piston providing a liquid chamber and an air chamber with a communicating orifice therebetween and hydraulic resistance regulating means correlated with said resilient medium and responsive to relative movement between said piston and cylinder to regulate the resistance to liquid flow between said chambers so as to produce in the shock absorber and during a relatively small initial movement between said piston and said cylinder and for the given kinetic energy to be dissipated, a maximum load not in excess of the maximum allowable and thereafter to regulate the resistance to prevent during the remaining and major portion of the stroke an increase in load beyond the maximum allowable, said regulating means including metering means to maintain the maximum resistance at a substantially constant value throughout a major portion of the stroke and to thereafter decrease the resistance during the dissipation of energy absorbed by said resilient medium.

15. In a shock absorber designed for use in connection with a resilient medium of given characteristics comprising a cylinder and a piston providing a liquid chamber and an air chamber with a communicating orifice therebetween and a metering pin having an initial portion of relatively short length cooperating with said orifice and correlated with said resilient medium to produce in the shock absorber and during a relative movement of said piston and cylinder corresponding substantially to the length of said portion a maximum load not in excess of the maximum allowable for the given kinetic energy to be dissipated and having a second portion thereafter to regulate the resistance to prevent during the remaining and major portion of the stroke an increase in load beyond the maximum allowable.

16. In a shock absorber designed for use in connection with a resilient medium of given characteristics comprising a cylinder and a piston providing a liquid chamber and an air chamber with a communicating orifice therebetween and a metering pin having an initial portion of relatively short length cooperating with said orifice and correlated with said resilient medium to produce in the shock absorber and during a relative movement of said piston and cylinder corresponding substantially to the length of said portion a maximum load not in excess of the maximum allowable for the given kinetic energy to be dissipated and having a second portion thereafter to maintain said maximum resistance at substantially constant value throughout the major portion of the piston stroke.

17. In a shock absorber designed for use in connection with a resilient medium of given characteristics comprising a cylinder and a piston providing a liquid chamber and an air chamber with a communicating orifice therebetween and a metering pin having an initial portion of relatively short length cooperating with said orifice and correlated with said resilient medium to produce in the shock absorber and during a relative movement of said piston and cylinder corresponding substantially to the length of said portion a maximum load not in excess of the maximum allowable for the given kinetic energy to be dissipated and having a second portion thereafter to maintain said maximum resistance at a substantially constant value throughout the main portion of the piston stroke, and a third portion to produce a decreasing resistance during the restoration of the resilient medium to static loaded position.

18. Means for absorbing and dissipating the kinetic energy of an aircraft in landing comprising, in combination, a pneumatic tire, an hydraulic energy dissipating medium including a piston and a cylinder providing a liquid chamber and an air chamber with a communicating orifice therebetween and hydraulic resistance regulating means cooperating with said communicating orifice and correlated with said tire to regulate the resistance to liquid flow between said chambers so as to produce in said tire and hydraulic dissipating medium, during a relatively small initial portion of the piston stroke and for the given kinetic energy to be dissipated, a maximum load not in excess of the maximum allowable and thereafter to regulate the resistance to prevent, during the remaining and major portion of the stroke, an increase in load beyond the maximum allowable.

19. In combination with a pneumatic tire, a given load deflection characteristic, a shock absorber comprising a cylinder and a piston providing a liquid chamber and an air chamber with a communicating orifice therebetween and hydraulic resistance regulating means correlated with said tire and responsive to relative movement between said piston and cylinder to regulate the resistance to liquid flow between said chambers so as to produce in the shock absorber and during a relatively small initial movement between said piston and said cylinder and for the given kinetic energy to be dissipated, a maximum load not in excess of the maximum allowable and thereafter to regulate the resistance to prevent, during the remaining and major portion of the stroke, an increase in load beyond the maximum allowable.

20. In combination with a pneumatic tire, a given load deflection characteristic, a shock absorber comprising a cylinder and a piston providing a liquid chamber and an air chamber with a communicating orifice therebetween and hydraulic resistance regulating means correlated with said tire and responsive to relative movement between said piston and cylinder to regulate the resistance to liquid flow between said chambers so as to produce in the shock absorber and during a relatively small initial movement between said piston and said cylinder and for the given kinetic energy to be dissipated, a maximum load not in excess of the maximum allowable and thereafter to regulate the resistance to prevent, during the remaining and major portion of the stroke, an increase in load beyond the maximum allowable, said regulating means including metering means to maintain the maximum resistance at a substantially constant value throughout the major portion of the stroke.

21. In combination with a pneumatic tire, a given load deflection characteristic, a shock absorber comprising a cylinder and a piston providing a liquid chamber and an air chamber with a communicating orifice therebetween and hydraulic resistance regulating means correlated with said tire and responsive to relative movement between said piston and cylinder to regulate the resistance to liquid flow between said chambers so as to produce in the shock absorber and during a relatively small initial movement between said piston and said cylinder and for the given kinetic energy to be dissipated, a maximum load not in excess of the maximum allowable and thereafter to regulate the resistance to prevent, during the remaining and major portion of the stroke, an increase in load beyond the maximum allowable, said regulating means including metering means to maintain the maximum resistance at a substantially constant value throughout a major portion of the stroke and to thereafter decrease the value of the resistance during the dissipation of energy absorbed by said tire.

THÉOPHILE DE PORT.